(12) United States Patent
Csontos et al.

(10) Patent No.: US 11,440,413 B2
(45) Date of Patent: Sep. 13, 2022

(54) ADJUSTING DEVICE FOR AN ELECTRICALLY OPERATED UTILITY VEHICLE AND METHOD FOR THE OPERATION THEREOF

(71) Applicant: KNORR-BREMSE SYSTEME FUER NUTZFAHRZEUGE GMBH, Munich (DE)

(72) Inventors: Peter Csontos, Budapest (HU); Denes Vanyi, Budapest (HU); Richard Budafoki, Györ (HU); Zoltán Nógrádi, Kismaros (HU); Melinda Hajos, Dad (HU)

(73) Assignee: Knorr-Bremse Systeme Fuer Nutzfahrzeuge GmbH, Munich (DE)

(*) Notice: Subject to any disclaimer, the term of this patent is extended or adjusted under 35 U.S.C. 154(b) by 315 days.

(21) Appl. No.: 16/634,256

(22) PCT Filed: Jul. 18, 2018

(86) PCT No.: PCT/EP2018/069456
§ 371 (c)(1),
(2) Date: Jan. 27, 2020

(87) PCT Pub. No.: WO2019/025183
PCT Pub. Date: Feb. 7, 2019

(65) Prior Publication Data
US 2020/0369157 A1 Nov. 26, 2020

(30) Foreign Application Priority Data
Jul. 31, 2017 (DE) .................... 10 2017 213 199.3

(51) Int. Cl.
*B60L 7/26* (2006.01)
*B60K 7/00* (2006.01)
(Continued)

(52) U.S. Cl.
CPC .............. *B60L 7/26* (2013.01); *B60K 7/0007* (2013.01); *B60L 7/12* (2013.01); *B60L 15/2036* (2013.01);
(Continued)

(58) Field of Classification Search
CPC .......... B60L 7/26; B60L 7/12; B60L 15/2036; B60L 2200/28; B60K 7/0007; B60K 2001/001; B60T 2201/04
(Continued)

(56) References Cited

U.S. PATENT DOCUMENTS

| 5,060,959 A | 10/1991 | Davis et al. | |
| 7,497,285 B1* | 3/2009 | Radev | B60W 20/00 180/65.225 |
| 2003/0122512 A1* | 7/2003 | Auerbach | B60L 7/16 318/139 |

(Continued)

FOREIGN PATENT DOCUMENTS

| DE | 102013014305 | 3/2015 |
| EP | 2394889 | 12/2011 |

(Continued)

OTHER PUBLICATIONS

International Search Report dated Nov. 12, 2018, of the corresponding International Application PCT/EP2018/069456 filed Jul. 18, 2018.

*Primary Examiner* — Gertrude Arthur Jeanglaude
(74) *Attorney, Agent, or Firm* — Norton Rose Fulbright US LLP; Gerard Messina; Aaron Deditch

(57) ABSTRACT

An adjusting apparatus for an electrically operated utility vehicle, which has a front axle; at least two rear axles; at least one electric motor for driving the rear axles; and a battery to supply the electric motor with electrical power; including: an adjusting device to adjust a level of at least one of the rear axles from the roadway; in which the adjusting
(Continued)

device is configured to identify a recovery mode in which the electric motor functions as a generator and is driven by the two rear axles in order to charge the battery; and in which the adjusting device is configured, when a recovery mode has been identified, to adjust the level and a load of the at least one adjustable rear axle so that the recovery is optimized. Also described is a related method and an electrically operated utility vehicle.

10 Claims, 2 Drawing Sheets

(51) Int. Cl.
    *B60L 7/12*    (2006.01)
    *B60L 15/20*   (2006.01)
    *B60K 1/00*    (2006.01)
(52) U.S. Cl.
    CPC ..... *B60K 2001/001* (2013.01); *B60L 2200/28* (2013.01); *B60T 2201/04* (2013.01)

(58) Field of Classification Search
    USPC ............................................................ 701/22
    See application file for complete search history.

(56) References Cited

U.S. PATENT DOCUMENTS

| 2008/0174174 | A1  | 7/2008  | Burns et al. |
|--------------|-----|---------|--------------|
| 2013/0066499 | A1* | 3/2013  | Niste ..................... B60L 3/0046 |
|              |     |         | 701/22 |
| 2014/0244082 | A1* | 8/2014  | Caron ..................... B60L 50/61 |
|              |     |         | 701/22 |
| 2014/0358340 | A1* | 12/2014 | Radev ..................... B60K 6/442 |
|              |     |         | 701/22 |

FOREIGN PATENT DOCUMENTS

| JP | 2011125204 A   | 6/2011  |
| WO | 2016179122 A1  | 11/2016 |
| WO | 2017/017169    | 2/2017  |

* cited by examiner

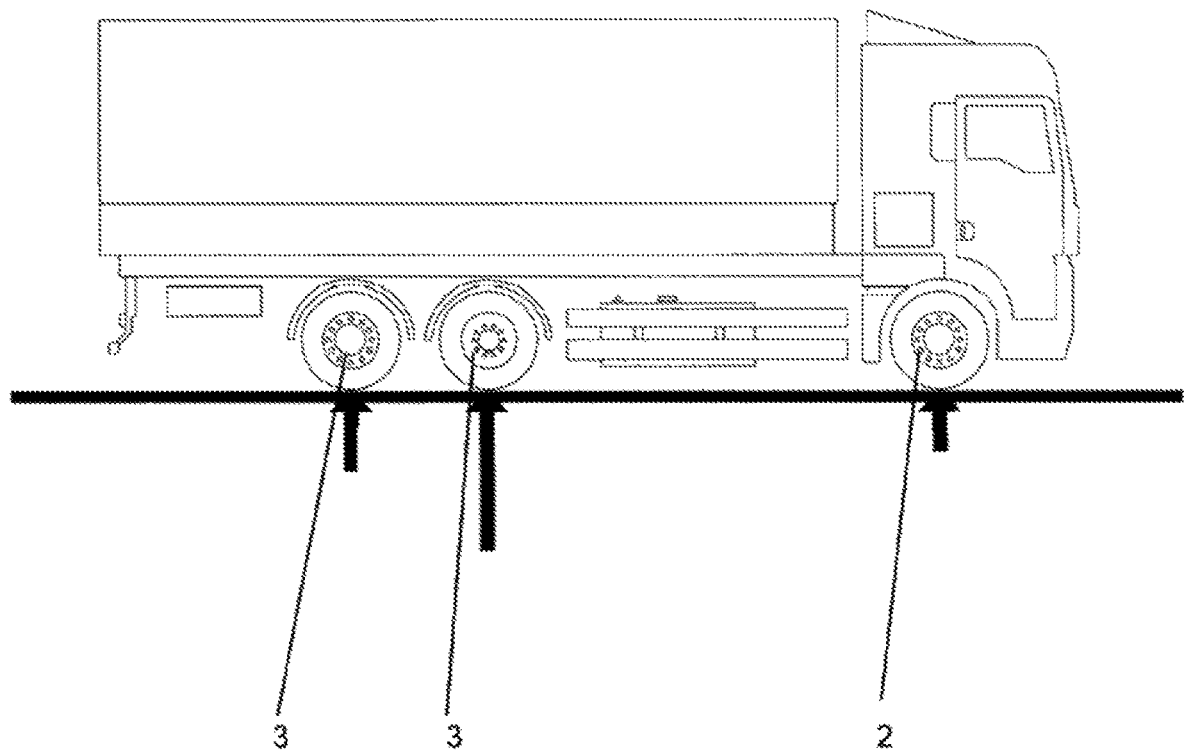

ADJUSTING DEVICE FOR AN ELECTRICALLY OPERATED UTILITY VEHICLE AND METHOD FOR THE OPERATION THEREOF

FIELD OF THE INVENTION

The present invention relates to an adjusting device for an electrically operated utility vehicle and a method for the operation thereof. The electrically operated utility vehicle has a front axle; at least two rear axles; at least one electric motor for driving the rear axles; and a battery which supplies the electric motor with electrical power; wherein the adjusting device is adapted to adjust a level of at least one of the rear axles from the roadway.

BACKGROUND INFORMATION

FIG. 2 shows such a utility vehicle from the prior art having a front axle 2 and two rear axles 3 which are arranged in pairs. A load distribution is possible between the rear axles 3. Generally, three types of load distributions are used. The first load distribution type uses a fixed load distribution so that, for example, one of the rear axles 3 is always a driven axle, whilst the other rear axle 3 is always a towed axle. The second load distribution type is variable, wherein the axle on which the larger load rests acts as a drive axle. The third load distribution type can be varied temporarily, wherein an axle becomes overloaded in a specific period of time, in order to support the traction. In FIG. 2, the different loads are indicated by arrows of different lengths.

The load distribution is carried out by a level adjustment system, which adjusts a level of one of the rear axles relative to the roadway. The level and the load are different parameters. The level can be adjusted continuously in such a manner that the load on both rear axles 3 is substantially identical over a specific period of time. The level adjustment system determines the supported load in accordance with specific parameters or an EoL adjustment (End-Of-Line). The supported load is maintained until the driver or a TCS system (Traction Control System) changes it, for example, in order to support the traction. The level adjustment system may adjust the load supported on the respective rear axle between 0% and 100% of the overall load, respectively.

An object of the present invention is to implement a level adjustment of the rear axles with an electrically operated utility vehicle. This object is achieved by the adjusting device for an electrically operated utility vehicle having the features described herein and the method for operating the electrically operated utility vehicle having the features described herein. Advantageous developments of the present invention are defined in the further descriptions herein.

The adjusting device is adapted according to the present invention to identify a recovery mode in which the electric motor functions as a generator and is driven by the two rear axles in order to charge the battery and to adjust the level and a load of the at least one adjustable rear axle in such a manner that the recovery is optimized. Advantageously, at both rear axles, sufficient roll resistances of the tires are adjusted in such a manner that the recovery with both rear axles is optimized. Substantially the same load may be applied to both rear axles. The present invention is particularly advantageous when the utility vehicle has a plurality of relatively small electric motors which are each fitted to an axle. As a result of the present invention, all the electric motors may be involved in an optimum manner in the recovery.

The adjusting device further has a gradient sensor and it may be adapted to identify the recovery mode when the gradient sensor detects downward travel of the utility vehicle. In a further manner, the adjusting device is adapted to identify the recovery mode when the following conditions are complied with: a) a gradient of the roadway detected by the gradient sensor is equal to or greater than a first predetermined value; b) an acceleration pedal of the utility vehicle is not activated; and c) the conditions a) and b) last for a predetermined time or longer. Consequently, the recovery mode is advantageously identified in a reliable manner. Furthermore, excessive switching by the adjusting device is prevented, in particular on short descents.

The present invention also comprises a method for operating an electrically operated utility vehicle which has a front axle, at least two rear axles, an adjusting device which adjusts a level of at least one of the rear axles from the roadway, at least one electric motor for driving the rear axles, and a battery which supplies the electric motor with electrical power. In the method according to the invention, the level of the at least one adjustable rear axle is adjusted in such a manner that a recovery mode is optimized in which the electric motor functions as a generator and is driven by the rear axles in order to charge the battery. Advantageously, on both rear axles sufficient rolling resistances of the tires are adjusted so that the recovery is optimized with both rear axles. Substantially the same load may be placed on both rear axles.

The rear axles are air-sprung axles and the loads supported on the rear axles may be detected by a pressure sensor which detects a pressure in an air bellows of the rear axles. The pressures detected are returned to the adjusting device. Consequently, the loads on the rear axles are adjusted precisely with little complexity.

An embodiment of the present invention is described below with reference to the appended drawings.

BRIEF DESCRIPTION OF THE DRAWINGS

FIG. 2 shows a utility vehicle from the prior art.

DETAILED DESCRIPTION

Figure 1:
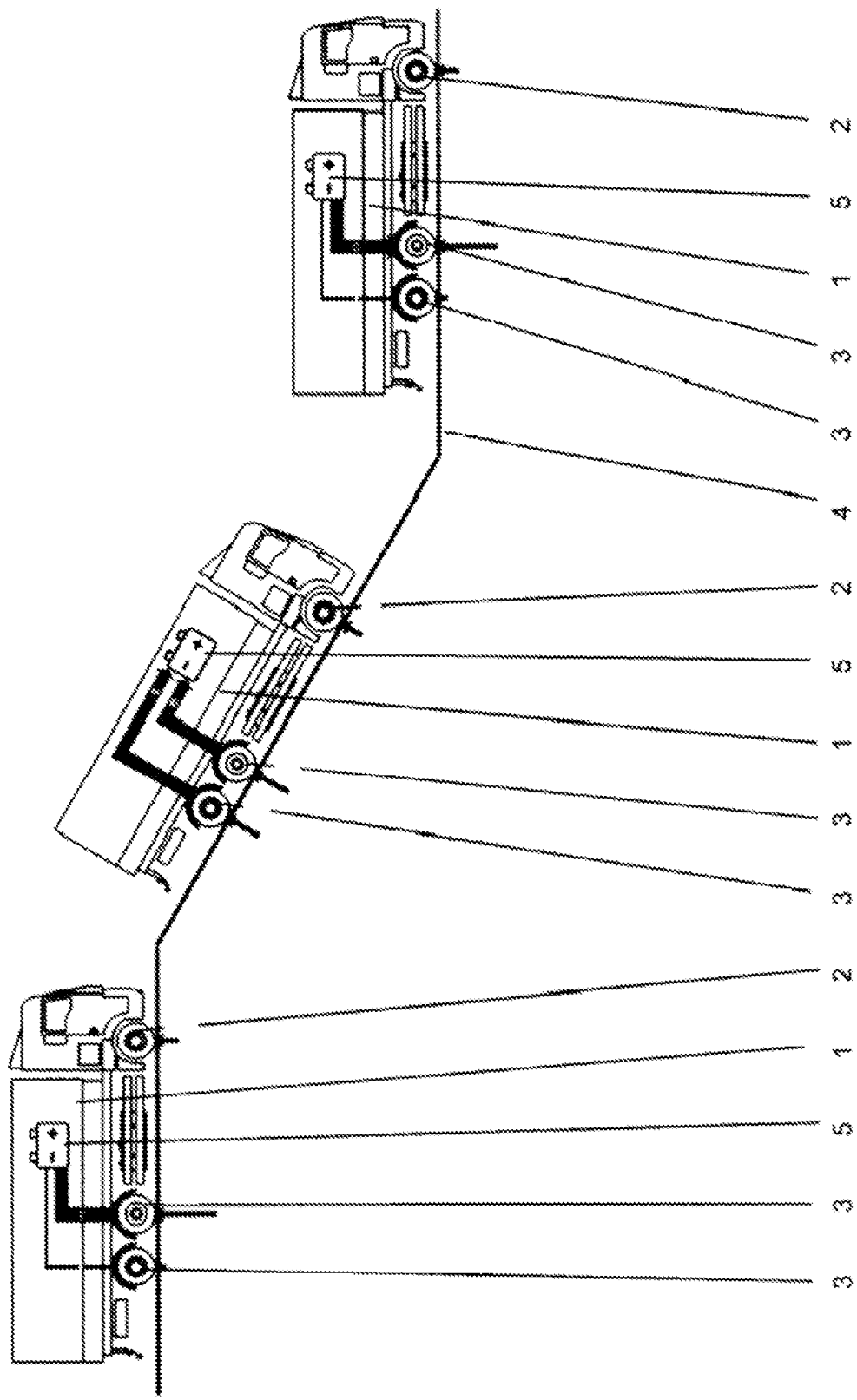
FIG. 1 shows a utility vehicle and a method for operating the utility vehicle according to an embodiment of the present invention.

FIG. 1 shows in three sequential views a utility vehicle and a method for operating the utility vehicle 1 according to an embodiment of the present invention.

The electrically operated utility vehicle 1 has a front axle 2; two rear axles 3; an adjusting device (not shown) which adjusts a level of at least one of the rear axles 3 (for example, the rear rear axle 3) from the roadway 4; electric motors for driving the rear axles 3; and a battery 5 which supplies the electric motors with electrical power. In the embodiment illustrated, there are provided a plurality of electric motors, which are each fitted to the axles 2, 3. The two rear axles 3 are arranged in pairs so that substantially the same load is placed thereon when they are adjusted to the same level from the roadway 4.

The left view of FIG. 1 shows normal operation on an even roadway 4. In this instance, one of the two rear axles 3, in this instance the front rear axle 3, acts as a main drive axle. The other rear axle 3, in this instance the rear rear axle 3, acts as an auxiliary drive axle.

This configuration is brought about by the adjusting device (not shown) by the level of the rear rear axle 3 from the roadway 4 being higher in comparison with the level of the front rear axle 3 from the roadway 4. When the rear rear axle 3 is completely raised from the roadway 4, it acts as an empty axle. In the views of FIG. 1, the different loads are indicated in each case by arrows of different lengths.

The middle view of FIG. 1 shows a recovery mode on a gradient. During recovery mode, the electric motor acts as a generator and is driven by the rear axles 3 in order to charge the battery 5. In this instance, the adjusting device adjusts the level and the load of the adjustable rear axle 3 in such a manner that the recovery is optimized. For example, the load of the rear axle 3 which was previously loaded more weakly can be increased, whereby at the same time the load of the rear axle 3 which was previously loaded to a greater extent is decreased. Consequently, as a result of the adjusting device, a load relationship of the rear axles 3 is adjusted in such a manner that the recovery is optimized. The adjusting device can adjust the level and the load of the adjustable rear axle 3 in such a manner that substantially the same load is placed on both rear axles 3. As a result, substantially the same roll resistances of the tires act on both rear axles 3 so that not only one rear axle 3, but instead both rear axles 3 support the recovery. The present invention is particularly advantageous when the utility vehicle 1 has a plurality of smaller electric motors, which are each fitted to an axle. As a result of the present invention, all the electric motors may be involved in the recovery in an optimum manner.

The right-hand view of FIG. 1 shows normal operation again on an even roadway 4 after the recovery mode on the gradient. In this instance, the adjusting device adjusts the level of the adjustable rear axle 3 in such a manner that both rear axles 3 are subjected to different loads. In this instance, one of the two rear axles 3, in this instance the front rear axle 3 again, can act as a main drive axle. The other rear axle 3, in this instance the rear rear axle 3 again, can act as an auxiliary drive axle or as an idle axle.

In the embodiment illustrated, the adjusting device may identify the recovery mode when a gradient sensor (not shown) detects downward travel of the utility vehicle 1, as in the central view of FIG. 1. In particular, the adjusting device can identify the recovery mode when the following conditions are complied with: a) a gradient of the roadway 4 detected by the gradient sensor is equal to or greater than a first predetermined value; b) an acceleration pedal (not shown) of the utility vehicle 1 is not actuated; and c) the conditions a) and b) last for a predetermined period of time or longer. Consequently, the recovery mode is advantageously identified in a reliable manner. Furthermore, excessive switching by the adjusting device is prevented, in particular on short descents.

The adjusting device may alternatively passively identify the recovery mode by receiving a recovery signal from an external device. The external device then carries out an active identification of the recovery mode.

In the method according to the embodiment, the rear axles 3 of the utility vehicle 1 may be air-sprung axles. The loads resting on the rear axles 3 can be detected by a pressure sensor (not shown) which detects a pressure in an air bellows (not shown) of the rear axles 3, wherein the pressures detected are returned to the adjusting device. Consequently, the loads on the rear axles 3 are adjusted or controlled precisely with little complexity.

The adjusting device is suitable for electrically operated utility vehicles, which are operated in a fully electrical manner and for hybrid vehicles which, in addition to an electric motor, have another drive, such as, for example, an internal combustion engine.

THE LIST OF REFERENCE NUMERALS IS AS FOLLOWS

1 Electrically operated utility vehicle
2 Front axle
3 Rear axle
4 Roadway
5 Battery

The invention claimed is:

1. An adjusting apparatus for an electrically operated utility vehicle, comprising:
   an adjusting device to adjust a level of at least one of at least two rear axles from the roadway, wherein the electrically operated utility vehicle has a front axle; the at least two rear axles; at least one electric motor for driving the rear axles; and a battery to supply the electric motor with electrical power;
   wherein the adjusting device identifies a recovery mode in which the electric motor functions as a generator and is driven by the two rear axles to charge the battery; and
   wherein, when the recovery mode has been identified, the adjusting device adjusts the level and a load of the at least one adjustable rear axle so that the recovery mode is optimized in which the electric motor functions as a generator and is driven by the two rear axles to charge the battery.

2. The adjusting device of claim 1, wherein, when the recovery mode is identified, the adjusting device adjusts the level of the at least one adjustable rear axle so that substantially the same load is placed on the two rear axles.

3. The adjusting device of claim 1, further comprising:
   a gradient sensor, wherein the adjusting device identifies the recovery mode when the gradient sensor detects downward travel of the utility vehicle.

4. The adjusting device of claim 3, wherein the adjusting device identifies the recovery mode when the following are satisfied:
   a) a gradient of the roadway detected by the gradient sensor is equal to or greater than a first predetermined value;
   b) an acceleration pedal of the utility vehicle is not activated; and
   c) the conditions a) and b) last for a predetermined time or longer.

5. A method for operating an electrically operated utility vehicle, which has a front axle, at least two rear axles, an adjusting device to adjust a level of at least one of the rear axles from the roadway, at least one electric motor for driving the rear axles, and a battery to supply the electric motor with electrical power, the method comprising:
   adjusting, via the adjusting device, a level and a load of the at least one adjustable rear axle so that a recovery mode is optimized in which the electric motor functions as a generator and is driven by the two rear axles to charge the battery.

6. The method of claim 5, wherein the level of the adjustable rear axle is adjusted so that substantially the same load is placed on both rear axles.

7. The method of claim 5, wherein, after the recovery mode has ended, the level of the adjustable rear axle is adjusted so that different loads are placed on both rear axles.

8. The method of claim 5, wherein the rear axles of the utility vehicle are air-sprung axles and the loads supported on the rear axles are detected in each case by a pressure sensor which detects a pressure in an air bellows of the rear axles, and wherein the detected pressures are returned to the adjusting device.

9. The method of claim 5, wherein the two rear axles are arranged in pairs.

10. An electrically operated utility vehicle, comprising:
a front axle;
at least two rear axles;
at least one electric motor for driving the rear axles;
a battery to supply the electric motor with electrical power; and
an adjusting device to adjust a level of at least one of the rear axles from the roadway;
wherein the adjusting device identifies a recovery mode in which the electric motor functions as a generator and is driven by the two rear axles to charge the battery; and
wherein, when a recovery mode has been identified, the adjusting device adjusts the level and a load of the at least one adjustable rear axle so that the recovery mode is optimized in which the electric motor functions as a generator and is driven by the two rear axles to charge the battery.

\* \* \* \* \*